United States Patent
Crawford (10) Patent No.: US 8,590,013 B2
(45) Date of Patent: Nov. 19, 2013

(54) METHOD OF MANAGING AND COMMUNICATING DATA PERTAINING TO SOFTWARE APPLICATIONS FOR PROCESSOR-BASED DEVICES COMPRISING WIRELESS COMMUNICATION CIRCUITRY

(76) Inventor: C. S. Lee Crawford, Irving, TX (US)

( * ) Notice: Subject to any disclaimer, the term of this patent is extended or adjusted under 35 U.S.C. 154(b) by 399 days.

(21) Appl. No.: 12/824,165

(22) Filed: Jun. 26, 2010

(65) Prior Publication Data

US 2011/0119734 A1  May 19, 2011

Related U.S. Application Data (63) Continuation-in-part of application No. 11/684,668, filed on Mar. 12, 2007, now abandoned, which is a continuation-in-part of application No. 11/424,644, filed on Jun. 16, 2006, now abandoned, and a continuation-in-part of application No. 10/368,311, filed on Feb. 15, 2003, now Pat. No. 7,194,637.

(60) Provisional application No. 60/691,383, filed on Jun. 18, 2005, provisional application No. 60/359,549, filed on Feb. 25, 2002.

(51) Int. Cl.
*G06F 7/04* (2006.01)
*G06F 15/16* (2006.01)
*G06F 17/30* (2006.01)
*G06F 21/00* (2013.01)

(52) U.S. Cl.
USPC ............ 726/3; 726/1; 726/4; 726/26; 726/27; 726/28; 726/29; 726/30; 380/247; 380/250; 705/7.25; 705/14.61; 705/14.64; 705/64; 705/59; 455/411; 713/153; 713/158; 713/182

(58) Field of Classification Search
USPC ........... 726/1, 3, 4, 26–30; 455/411; 713/153, 713/158, 182; 380/247, 250; 705/7.25, 705/14.61, 64, 59, 14
See application file for complete search history.

(56) References Cited

U.S. PATENT DOCUMENTS

| | | | |
|---|---|---|---|
| 5,655,081 A * | 8/1997 | Bonnell et al. | 709/202 |
| 5,671,436 A | 9/1997 | Morris et al. | |
| 5,778,182 A * | 7/1998 | Cathey et al. | 709/219 |
| 5,778,316 A | 7/1998 | Persson et al. | |
| 5,937,413 A | 8/1999 | Hyun et al. | |
| 5,943,611 A | 8/1999 | Molne | |
| 5,948,061 A | 9/1999 | Merriman et al. | |
| 5,963,940 A | 10/1999 | Liddy et al. | |
| 5,973,683 A | 10/1999 | Cragun et al. | |
| 5,996,011 A | 11/1999 | Humes | |

(Continued)

*Primary Examiner* — Edan Orgad
*Assistant Examiner* — Kari Schmidt (57) ABSTRACT

In one embodiment, a system processes access decisions for individuals where the system includes a portable handheld housing for the processor, display, internal memory, and card reader of the system. The system further includes software comprising: code for downloading, in a first mode of operation through the wireless communication circuitry, to the internal memory, access rights information from a distribution server, the access rights information, for multiple users, independently originating and being cryptographically authenticated from multiple sources, the access rights information revocation data that is specific to respective identified individual users; code for reading and processing identity information and access rights information from a portable memory card via the reader in a second mode of operation, the identify information comprising first and last name information pertaining to a specific user and employer organization information of the specific user, the code for reading and processing cryptographically authenticating information.

18 Claims, 6 Drawing Sheets

(56) References Cited

U.S. PATENT DOCUMENTS

| | | |
|---|---|---|
| 6,006,225 A | 12/1999 | Bowman et al. |
| 6,012,002 A | 1/2000 | Tapping et al. |
| 6,029,139 A | 2/2000 | Cunningham et al. |
| 6,029,141 A | 2/2000 | Bezos et al. |
| 6,045,048 A | 4/2000 | Wilz, Sr. et al. |
| 6,061,658 A | 5/2000 | Chou et al. |
| 6,078,314 A | 6/2000 | Ahn |
| 6,092,100 A | 7/2000 | Berstis et al. |
| 6,097,939 A | 8/2000 | Jacobs |
| 6,135,349 A | 10/2000 | Zirkel |
| 6,141,341 A | 10/2000 | Jones et al. |
| 6,161,182 A * | 12/2000 | Nadooshan ............... 713/172 |
| 6,178,407 B1 | 1/2001 | Lotvin et al. |
| 6,182,050 B1 | 1/2001 | Ballard |
| 6,199,099 B1 | 3/2001 | Gershman et al. |
| 6,216,129 B1 | 4/2001 | Eldering |
| 6,226,510 B1 | 5/2001 | Boling et al. |
| 6,246,997 B1 | 6/2001 | Cybul et al. |
| 6,247,047 B1 | 6/2001 | Wolff |
| 6,253,188 B1 | 6/2001 | Witek et al. |
| 6,269,361 B1 | 7/2001 | Davis et al. |
| 6,285,985 B1 * | 9/2001 | Horstmann ............. 705/14.61 |
| 6,285,987 B1 | 9/2001 | Roth et al. |
| 6,327,470 B1 | 12/2001 | Ostling |
| 6,336,117 B1 | 1/2002 | Massarani |
| 6,339,761 B1 | 1/2002 | Cottingham |
| 6,356,905 B1 | 3/2002 | Gershman et al. |
| 6,374,177 B1 | 4/2002 | Lee et al. |
| 6,389,538 B1 * | 5/2002 | Gruse et al. ............... 713/194 |
| 6,434,532 B2 * | 8/2002 | Goldband et al. ......... 705/7.25 |
| 6,446,076 B1 | 9/2002 | Burkey et al. |
| 6,480,837 B1 | 11/2002 | Dutta |
| 6,487,538 B1 | 11/2002 | Gupta et al. |
| 6,512,919 B2 | 1/2003 | Ogasawara |
| 6,516,416 B2 | 2/2003 | Gregg et al. |
| 6,519,585 B1 | 2/2003 | Kohli |
| 6,526,275 B1 | 2/2003 | Calvert |
| 6,556,997 B1 | 4/2003 | Levy |
| 6,559,828 B1 | 5/2003 | Impio |
| 6,560,651 B2 | 5/2003 | Katz et al. |
| 6,564,327 B1 | 5/2003 | Klensin et al. |
| 6,573,883 B1 | 6/2003 | Bartlett |
| 6,577,861 B2 | 6/2003 | Ogasawara |
| 6,606,657 B1 * | 8/2003 | Zilberstein et al. ......... 709/224 |
| 6,615,172 B1 | 9/2003 | Bennett et al. |
| 6,625,732 B1 * | 9/2003 | Weirauch et al. ............. 726/26 |
| 6,631,372 B1 | 10/2003 | Graham |
| 6,647,269 B2 | 11/2003 | Hendrey et al. |
| 6,651,053 B1 | 11/2003 | Rothschild |
| 6,664,922 B1 | 12/2003 | Fan |
| 6,665,837 B1 | 12/2003 | Dean et al. |
| 6,701,317 B1 | 3/2004 | Wiener et al. |
| 6,704,727 B1 | 3/2004 | Kravets |
| 6,704,787 B1 | 3/2004 | Umbreit |
| 6,718,324 B2 | 4/2004 | Edlund et al. |
| 6,718,365 B1 | 4/2004 | Dutta |
| 6,728,731 B2 | 4/2004 | Sarukkai et al. |
| 6,742,047 B1 | 5/2004 | Tso |
| 6,772,340 B1 * | 8/2004 | Peinado et al. ............. 713/168 |
| 6,775,537 B2 | 8/2004 | Panichkul et al. |
| 6,775,831 B1 | 8/2004 | Carrasco et al. |
| 6,778,834 B2 | 8/2004 | Laitinen et al. |
| 6,778,975 B1 | 8/2004 | Anick et al. |
| 6,799,298 B2 | 9/2004 | deVries et al. |
| 6,813,489 B1 | 11/2004 | Wu et al. |
| 6,813,501 B2 | 11/2004 | Kinnunen et al. |
| 6,826,572 B2 | 11/2004 | Colace et al. |
| 6,829,475 B1 | 12/2004 | Hede et al. |
| 6,832,259 B2 | 12/2004 | Hymel et al. |
| 6,834,195 B2 | 12/2004 | Brandenberg et al. |
| 6,842,767 B1 | 1/2005 | Partovi et al. |
| 6,853,982 B2 | 2/2005 | Smith et al. |
| 6,871,202 B2 | 3/2005 | Broder |
| 6,876,997 B1 | 4/2005 | Rorex et al. |
| 6,892,206 B2 | 5/2005 | Dharap |
| 6,896,188 B1 | 5/2005 | Graham |
| 6,904,408 B1 | 6/2005 | McCarthy et al. |
| 6,907,566 B1 | 6/2005 | McElfresh et al. |
| 6,920,448 B2 | 7/2005 | Kincaid et al. |
| 6,934,855 B1 * | 8/2005 | Kipnis et al. ................... 726/20 |
| 6,937,998 B1 | 8/2005 | Swartz et al. |
| 6,941,376 B2 | 9/2005 | Mitchell et al. |
| 6,944,447 B2 * | 9/2005 | Portman et al. ............ 455/422.1 |
| 6,947,930 B2 | 9/2005 | Anick et al. |
| 6,950,994 B2 | 9/2005 | Dharap |
| 6,954,641 B2 | 10/2005 | McKenna et al. |
| 6,963,867 B2 | 11/2005 | Ford et al. |
| 6,968,178 B2 | 11/2005 | Pradhan et al. |
| 6,968,179 B1 | 11/2005 | De Vries |
| 6,968,333 B2 | 11/2005 | Abbott et al. |
| 6,978,263 B2 | 12/2005 | Soulanille |
| 6,978,264 B2 | 12/2005 | Chandrasekar et al. |
| 6,983,272 B2 | 1/2006 | Davis et al. |
| 6,983,280 B2 | 1/2006 | Cheung et al. |
| 6,993,494 B1 | 1/2006 | Boushy et al. |
| 7,007,239 B1 | 2/2006 | Hawkins et al. |
| 7,013,292 B1 | 3/2006 | Hsu et al. |
| 7,020,654 B1 | 3/2006 | Najmi |
| 7,027,987 B1 | 4/2006 | Franz et al. |
| 7,035,811 B2 | 4/2006 | Gorenstein |
| 7,047,033 B2 | 5/2006 | Wyler |
| 7,062,258 B1 | 6/2006 | Sini et al. |
| 7,062,453 B1 | 6/2006 | Clarke |
| 7,071,842 B1 | 7/2006 | Brady, Jr. |
| 7,089,036 B2 | 8/2006 | Prise |
| 7,120,235 B2 | 10/2006 | Altberg et al. |
| 7,130,923 B2 | 10/2006 | Mason |
| 7,159,194 B2 | 1/2007 | Wong et al. |
| 7,162,493 B2 | 1/2007 | Weiss et al. |
| 7,184,020 B2 | 2/2007 | Matsui |
| 7,185,088 B1 | 2/2007 | Joy et al. |
| 7,188,307 B2 | 3/2007 | Ohsawa |
| 7,191,177 B2 | 3/2007 | Konaka |
| 7,219,309 B2 | 5/2007 | Kaasila et al. |
| 7,249,123 B2 | 7/2007 | Elder et al. |
| 7,269,590 B2 | 9/2007 | Hull et al. |
| 7,277,718 B2 | 10/2007 | Wong |
| 7,281,042 B2 | 10/2007 | Hsu et al. |
| 7,289,623 B2 | 10/2007 | Lurie |
| 7,308,261 B2 | 12/2007 | Henderson et al. |
| 7,330,890 B1 | 2/2008 | Partovi et al. |
| 7,376,714 B1 | 5/2008 | Gerken |
| 7,437,364 B1 | 10/2008 | Fredricksen et al. |
| 7,461,528 B2 | 12/2008 | Taniguchi et al. |
| 7,480,867 B1 | 1/2009 | Racine et al. |
| 7,487,112 B2 | 2/2009 | Barnes, Jr. |
| 7,669,123 B2 | 2/2010 | Zuckerberg et al. |
| 7,698,228 B2 * | 4/2010 | Gailey et al. ..................... 705/64 |
| 7,769,764 B2 | 8/2010 | Ramer et al. |
| 2001/0030234 A1 | 10/2001 | Wiklof |
| 2001/0037174 A1 | 11/2001 | Dickerson |
| 2001/0037721 A1 | 11/2001 | Hasegawa et al. |
| 2001/0041561 A1 | 11/2001 | Ventulett et al. |
| 2001/0044758 A1 | 11/2001 | Talib et al. |
| 2001/0049636 A1 | 12/2001 | Hudda et al. |
| 2001/0049677 A1 | 12/2001 | Talib et al. |
| 2001/0051911 A1 | 12/2001 | Marks et al. |
| 2001/0054001 A1 | 12/2001 | Robinson |
| 2001/0054066 A1 * | 12/2001 | Spitzer ........................ 709/203 |
| 2002/0013727 A1 | 1/2002 | Lee |
| 2002/0029186 A1 | 3/2002 | Roth et al. |
| 2002/0029267 A1 | 3/2002 | Sankuratripati et al. |
| 2002/0040395 A1 * | 4/2002 | Davis et al. ................... 709/224 |
| 2002/0046104 A1 | 4/2002 | Kaddeche et al. |
| 2002/0049679 A1 * | 4/2002 | Russell et al. ................... 705/52 |
| 2002/0051521 A1 | 5/2002 | Patrick |
| 2002/0052674 A1 | 5/2002 | Chang et al. |
| 2002/0052781 A1 | 5/2002 | Aufricht et al. |
| 2002/0053076 A1 | 5/2002 | Landesmann |
| 2002/0059201 A1 | 5/2002 | Work |
| 2002/0062310 A1 | 5/2002 | Marmor et al. |
| 2002/0063735 A1 * | 5/2002 | Tamir et al. ................... 345/745 |
| 2002/0065713 A1 * | 5/2002 | Awada et al. ..................... 705/14 |
| 2002/0073420 A1 | 6/2002 | Yoon |

(56) References Cited

U.S. PATENT DOCUMENTS

| | | |
|---|---|---|
| 2002/0077084 A1 | 6/2002 | Zellner et al. |
| 2002/0077897 A1 | 6/2002 | Zellner et al. |
| 2002/0077908 A1 | 6/2002 | Sakuma et al. |
| 2002/0078045 A1 | 6/2002 | Dutta |
| 2002/0078209 A1 | 6/2002 | Peng |
| 2002/0082049 A1 | 6/2002 | Prise |
| 2002/0087408 A1 | 7/2002 | Burnett |
| 2002/0123928 A1 | 9/2002 | Eldering et al. |
| 2002/0143860 A1 | 10/2002 | Catan |
| 2002/0156677 A1* | 10/2002 | Peters et al. ............... 705/14 |
| 2002/0165773 A1 | 11/2002 | Natsuno et al. |
| 2002/0169654 A1 | 11/2002 | Santos et al. |
| 2002/0171546 A1* | 11/2002 | Evans et al. ............... 340/540 |
| 2002/0171691 A1 | 11/2002 | Currans et al. |
| 2002/0178271 A1* | 11/2002 | Graham et al. ............ 709/229 |
| 2002/0198791 A1 | 12/2002 | Perkowski |
| 2003/0003929 A1 | 1/2003 | Himmel et al. |
| 2003/0004831 A1 | 1/2003 | Owens |
| 2003/0006911 A1 | 1/2003 | Smith et al. |
| 2003/0014659 A1 | 1/2003 | Zhu |
| 2003/0020749 A1 | 1/2003 | Abu-Hakima et al. |
| 2003/0028889 A1 | 2/2003 | McCoskey et al. |
| 2003/0045273 A1 | 3/2003 | Pyhalammi et al. |
| 2003/0050863 A1 | 3/2003 | Radwin |
| 2003/0055831 A1 | 3/2003 | Ryan et al. |
| 2003/0058842 A1 | 3/2003 | Bud |
| 2003/0060189 A1* | 3/2003 | Minear et al. ............... 455/411 |
| 2003/0060198 A1 | 3/2003 | Li |
| 2003/0063072 A1 | 4/2003 | Brandenberg et al. |
| 2003/0065805 A1 | 4/2003 | Barnes |
| 2003/0078882 A1 | 4/2003 | Sukeda et al. |
| 2003/0079222 A1 | 4/2003 | Boykin et al. |
| 2003/0083999 A1* | 5/2003 | Ramachandran et al. ...... 705/59 |
| 2003/0084098 A1 | 5/2003 | Lavin et al. |
| 2003/0093311 A1 | 5/2003 | Knowlson |
| 2003/0093314 A1 | 5/2003 | Leung et al. |
| 2003/0100320 A1 | 5/2003 | Ranjan |
| 2003/0115318 A1 | 6/2003 | Wueste |
| 2003/0126095 A1 | 7/2003 | Allen |
| 2003/0130887 A1 | 7/2003 | Nathaniel |
| 2003/0132298 A1 | 7/2003 | Swartz et al. |
| 2003/0135581 A1 | 7/2003 | Phelan et al. |
| 2003/0135582 A1 | 7/2003 | Allen et al. |
| 2003/0135825 A1 | 7/2003 | Gertner et al. |
| 2003/0140004 A1 | 7/2003 | O'Leary et al. |
| 2003/0145093 A1 | 7/2003 | Oren et al. |
| 2003/0146932 A1 | 8/2003 | Weng et al. |
| 2003/0149793 A1 | 8/2003 | Bannoura et al. |
| 2003/0149937 A1 | 8/2003 | McElfresh et al. |
| 2003/0149938 A1 | 8/2003 | McElfresh et al. |
| 2003/0150915 A1* | 8/2003 | Reece ............... 235/449 |
| 2003/0158776 A1 | 8/2003 | Landesmann |
| 2003/0163833 A1 | 8/2003 | Chiba et al. |
| 2003/0172145 A1 | 9/2003 | Nguyen |
| 2003/0187878 A1 | 10/2003 | Sandifer |
| 2003/0187996 A1 | 10/2003 | Cardina et al. |
| 2003/0195009 A1 | 10/2003 | Endo |
| 2003/0204447 A1 | 10/2003 | Dalzell et al. |
| 2003/0222918 A1 | 12/2003 | Coulthard |
| 2003/0225632 A1 | 12/2003 | Tong et al. |
| 2003/0226866 A1 | 12/2003 | Har-Shen |
| 2004/0019478 A1 | 1/2004 | Rucker et al. |
| 2004/0023644 A1 | 2/2004 | Montemer |
| 2004/0024752 A1 | 2/2004 | Manber et al. |
| 2004/0024846 A1 | 2/2004 | Randall et al. |
| 2004/0044571 A1 | 3/2004 | Bronnimann et al. |
| 2004/0054569 A1 | 3/2004 | Pombo et al. |
| 2004/0059708 A1 | 3/2004 | Dean et al. |
| 2004/0068552 A1 | 4/2004 | Kotz et al. |
| 2004/0073574 A1 | 4/2004 | Shimizu et al. |
| 2004/0088177 A1 | 5/2004 | Travis et al. |
| 2004/0122735 A1 | 6/2004 | Meshkin |
| 2004/0148275 A1 | 7/2004 | Achlioptas |
| 2004/0158630 A1 | 8/2004 | Chang et al. |
| 2004/0193698 A1 | 9/2004 | Lakshminarayana |
| 2004/0199422 A1 | 10/2004 | Napier et al. |
| 2004/0199575 A1 | 10/2004 | Geller |
| 2004/0203630 A1 | 10/2004 | Wang |
| 2004/0203854 A1 | 10/2004 | Nowak |
| 2004/0218562 A1 | 11/2004 | Orava et al. |
| 2004/0220926 A1 | 11/2004 | Lamkin et al. |
| 2004/0225647 A1 | 11/2004 | Connelly et al. |
| 2004/0230461 A1 | 11/2004 | Talib et al. |
| 2004/0230503 A1 | 11/2004 | Lucas |
| 2004/0230574 A1 | 11/2004 | Kravets |
| 2004/0243569 A1 | 12/2004 | Burrows |
| 2004/0249768 A1 | 12/2004 | Kontio et al. |
| 2004/0260689 A1 | 12/2004 | Colace et al. |
| 2005/0021110 A1 | 1/2005 | Maschke et al. |
| 2005/0021750 A1 | 1/2005 | Abrams |
| 2005/0027666 A1 | 2/2005 | Beck et al. |
| 2005/0041647 A1 | 2/2005 | Stinnie |
| 2005/0064852 A1 | 3/2005 | Baldursson |
| 2005/0065917 A1 | 3/2005 | Anick et al. |
| 2005/0065995 A1 | 3/2005 | Milstein et al. |
| 2005/0068169 A1 | 3/2005 | Copley et al. |
| 2005/0071325 A1 | 3/2005 | Bem |
| 2005/0071741 A1 | 3/2005 | Acharya et al. |
| 2005/0075932 A1 | 4/2005 | Mankoff |
| 2005/0076014 A1 | 4/2005 | Agarwal et al. |
| 2005/0080665 A1* | 4/2005 | Bowman-Amuah ............ 705/14 |
| 2005/0086112 A1 | 4/2005 | Shkedi |
| 2005/0097204 A1 | 5/2005 | Horowitz et al. |
| 2005/0114312 A1 | 5/2005 | Mosescu |
| 2005/0114759 A1 | 5/2005 | Williams et al. |
| 2005/0119936 A1 | 6/2005 | Buchanan et al. |
| 2005/0125723 A1 | 6/2005 | Griswold et al. |
| 2005/0131762 A1 | 6/2005 | Bharat et al. |
| 2005/0144065 A1 | 6/2005 | Calabria et al. |
| 2005/0144073 A1 | 6/2005 | Morrisroe et al. |
| 2005/0144297 A1 | 6/2005 | Dahlstrom et al. |
| 2005/0149399 A1 | 7/2005 | Fukunaga et al. |
| 2005/0154639 A1 | 7/2005 | Zetmeir |
| 2005/0154716 A1 | 7/2005 | Watson et al. |
| 2005/0154717 A1 | 7/2005 | Watson et al. |
| 2005/0159164 A1 | 7/2005 | Leedom, Jr. |
| 2005/0159970 A1 | 7/2005 | Buyukkokten et al. |
| 2005/0165666 A1 | 7/2005 | Wong et al. |
| 2005/0171799 A1 | 8/2005 | Hull et al. |
| 2005/0171863 A1 | 8/2005 | Hagen |
| 2005/0171936 A1 | 8/2005 | Zhu |
| 2005/0171955 A1 | 8/2005 | Hull et al. |
| 2005/0177385 A1 | 8/2005 | Hull et al. |
| 2005/0177593 A1 | 8/2005 | Solomon |
| 2005/0185060 A1 | 8/2005 | Neven, Sr. |
| 2005/0187971 A1 | 8/2005 | Hassan et al. |
| 2005/0190747 A1 | 9/2005 | Sindhwani et al. |
| 2005/0191936 A1 | 9/2005 | Marine et al. |
| 2005/0197846 A1 | 9/2005 | Pezaris et al. |
| 2005/0198020 A1 | 9/2005 | Garland et al. |
| 2005/0198031 A1 | 9/2005 | Pezaris et al. |
| 2005/0198095 A1 | 9/2005 | Du et al. |
| 2005/0198305 A1 | 9/2005 | Pezaris et al. |
| 2005/0203807 A1 | 9/2005 | Bezos et al. |
| 2005/0203888 A1 | 9/2005 | Woosley et al. |
| 2005/0216300 A1 | 9/2005 | Appelman et al. |
| 2005/0216550 A1 | 9/2005 | Paseman et al. |
| 2005/0221843 A1 | 10/2005 | Friedman et al. |
| 2005/0222989 A1 | 10/2005 | Haveliwala et al. |
| 2005/0223000 A1 | 10/2005 | Davis et al. |
| 2005/0227676 A1 | 10/2005 | De Vries |
| 2005/0233742 A1 | 10/2005 | Karaoguz et al. |
| 2005/0234768 A1 | 10/2005 | Wald et al. |
| 2005/0234891 A1 | 10/2005 | Walther et al. |
| 2005/0234929 A1 | 10/2005 | Ionescu et al. |
| 2005/0235062 A1 | 10/2005 | Lunt et al. |
| 2005/0240472 A1 | 10/2005 | Postrel |
| 2005/0240477 A1 | 10/2005 | Friday et al. |
| 2005/0240557 A1 | 10/2005 | Rorex et al. |
| 2005/0246132 A1 | 11/2005 | Olin et al. |
| 2005/0256756 A1 | 11/2005 | Lam et al. |
| 2005/0266889 A1 | 12/2005 | Kuhl et al. |
| 2005/0289113 A1 | 12/2005 | Bookstaff |
| 2005/0289468 A1 | 12/2005 | Kahn et al. |

(56) References Cited

U.S. PATENT DOCUMENTS

| | | |
|---|---|---|
| 2006/0004594 A1 | 1/2006 | Doliov |
| 2006/0004627 A1 | 1/2006 | Baluja |
| 2006/0004739 A1 | 1/2006 | Anthony et al. |
| 2006/0004850 A1 | 1/2006 | Chowdhury |
| 2006/0010699 A1 | 1/2006 | Tamura |
| 2006/0015201 A1 | 1/2006 | Lapstun et al. |
| 2006/0019716 A1 | 1/2006 | Pell et al. |
| 2006/0036565 A1 | 2/2006 | Bruecken |
| 2006/0041543 A1 | 2/2006 | Achlioptas |
| 2006/0041556 A1 | 2/2006 | Taniguchi et al. |
| 2006/0042483 A1 | 3/2006 | Work et al. |
| 2006/0048059 A1 | 3/2006 | Etkin |
| 2006/0052091 A1 | 3/2006 | Onyon et al. |
| 2006/0059129 A1 | 3/2006 | Azuma et al. |
| 2006/0073810 A1 | 4/2006 | Pyhalammi et al. |
| 2006/0074883 A1 | 4/2006 | Teevan et al. |
| 2006/0075335 A1 | 4/2006 | Gloor |
| 2006/0080613 A1 | 4/2006 | Savant |
| 2006/0085419 A1 | 4/2006 | Rosen |
| 2006/0085750 A1 | 4/2006 | Easton, Jr. et al. |
| 2006/0100998 A1 | 5/2006 | Edwards et al. |
| 2006/0106674 A1 | 5/2006 | Muller |
| 2006/0106710 A1 | 5/2006 | Meek et al. |
| 2006/0112179 A1 | 5/2006 | Baumeister et al. |
| 2006/0122879 A1 | 6/2006 | O'Kelley |
| 2006/0123014 A1 | 6/2006 | Ng |
| 2006/0123053 A1 | 6/2006 | Scannell, Jr. |
| 2006/0129541 A1 | 6/2006 | Morgan et al. |
| 2006/0136419 A1 | 6/2006 | Brydon et al. |
| 2006/0143183 A1 | 6/2006 | Goldberg et al. |
| 2006/0155597 A1 | 7/2006 | Gleason |
| 2006/0155706 A1 | 7/2006 | Kalinichenko et al. |
| 2006/0161599 A1 | 7/2006 | Rosen |
| 2006/0161778 A1 | 7/2006 | Stirbu et al. |
| 2006/0167747 A1 | 7/2006 | Goodman et al. |
| 2006/0178986 A1 | 8/2006 | Giordano et al. |
| 2006/0184417 A1 | 8/2006 | Van der Linden et al. |
| 2006/0184617 A1 | 8/2006 | Nicholas et al. |
| 2006/0190281 A1 | 8/2006 | Kott et al. |
| 2006/0190328 A1 | 8/2006 | Singh et al. |
| 2006/0194186 A1 | 8/2006 | Nanda |
| 2006/0212451 A1 | 9/2006 | Serdy, Jr. et al. |
| 2006/0217110 A1 | 9/2006 | Othmer |
| 2006/0218225 A1 | 9/2006 | Hee Voon et al. |
| 2006/0224447 A1 | 10/2006 | Koningstein |
| 2006/0229063 A1 | 10/2006 | Koch |
| 2006/0230061 A1 | 10/2006 | Sample et al. |
| 2006/0236257 A1 | 10/2006 | Othmer et al. |
| 2006/0236258 A1 | 10/2006 | Othmer et al. |
| 2006/0242007 A1 | 10/2006 | Leong et al. |
| 2006/0242017 A1 | 10/2006 | Libes et al. |
| 2006/0242129 A1 | 10/2006 | Libes et al. |
| 2006/0247940 A1 | 11/2006 | Zhu et al. |
| 2006/0248573 A1 | 11/2006 | Pannu et al. |
| 2006/0253427 A1 | 11/2006 | Wu et al. |
| 2006/0256008 A1 | 11/2006 | Rosenberg |
| 2006/0256130 A1 | 11/2006 | Gonzalez |
| 2006/0259365 A1 | 11/2006 | Agarwal et al. |
| 2006/0259434 A1 | 11/2006 | Vilcauskas, Jr. et al. |
| 2006/0259479 A1 | 11/2006 | Dai |
| 2006/0265227 A1 | 11/2006 | Sadamura et al. |
| 2006/0271425 A1 | 11/2006 | Goodman et al. |
| 2006/0271438 A1 | 11/2006 | Shotland et al. |
| 2006/0287919 A1 | 12/2006 | Rubens et al. |
| 2006/0287936 A1 | 12/2006 | Jacobson |
| 2006/0288015 A1 | 12/2006 | Schirripa et al. |
| 2006/0293065 A1 | 12/2006 | Chew et al. |
| 2006/0293976 A1 | 12/2006 | Nam |
| 2006/0294025 A1 | 12/2006 | Mengerink |
| 2006/0294094 A1 | 12/2006 | King et al. |
| 2007/0005570 A1 | 1/2007 | Hurst-Hiller et al. |
| 2007/0005584 A1 | 1/2007 | Feng et al. |
| 2007/0005587 A1 | 1/2007 | Johnson et al. |
| 2007/0011078 A1 | 1/2007 | Jain et al. |
| 2007/0016473 A1 | 1/2007 | Anderson et al. |
| 2007/0027744 A1 | 2/2007 | Carson et al. |
| 2007/0027751 A1 | 2/2007 | Carson et al. |
| 2007/0027839 A1 | 2/2007 | Ives |
| 2007/0027857 A1 | 2/2007 | Deng et al. |
| 2007/0032240 A1 | 2/2007 | Finnegan et al. |
| 2007/0033210 A1 | 2/2007 | Baudino et al. |
| 2007/0060173 A1 | 3/2007 | Ramer et al. |
| 2007/0061146 A1 | 3/2007 | Jaramillo et al. |
| 2007/0061197 A1 | 3/2007 | Ramer et al. |
| 2007/0061198 A1 | 3/2007 | Ramer et al. |
| 2007/0061211 A1 | 3/2007 | Ramer et al. |
| 2007/0061229 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061301 A1 | 3/2007 | Ramer et al. |
| 2007/0061302 A1 | 3/2007 | Ramer et al. |
| 2007/0061303 A1 | 3/2007 | Ramer et al. |
| 2007/0061317 A1 | 3/2007 | Ramer et al. |
| 2007/0061328 A1 | 3/2007 | Ramer et al. |
| 2007/0061331 A1 | 3/2007 | Ramer et al. |
| 2007/0061332 A1 | 3/2007 | Ramer et al. |
| 2007/0061333 A1 | 3/2007 | Ramer et al. |
| 2007/0061334 A1 | 3/2007 | Ramer et al. |
| 2007/0061335 A1 | 3/2007 | Ramer et al. |
| 2007/0061336 A1 | 3/2007 | Ramer et al. |
| 2007/0061363 A1 | 3/2007 | Ramer et al. |
| 2007/0067267 A1 | 3/2007 | Ives |
| 2007/0067824 A1 | 3/2007 | Silverbrook et al. |
| 2007/0073656 A1 | 3/2007 | Bandi |
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0078832 A1 | 4/2007 | Ott, IV et al. |
| 2007/0078851 A1 | 4/2007 | Grell et al. |
| 2007/0083611 A1 | 4/2007 | Farago et al. |
| 2007/0094042 A1 | 4/2007 | Ramer et al. |
| 2007/0100650 A1 | 5/2007 | Ramer et al. |
| 2007/0100651 A1 | 5/2007 | Ramer et al. |
| 2007/0100652 A1 | 5/2007 | Ramer et al. |
| 2007/0100653 A1 | 5/2007 | Ramer et al. |
| 2007/0100805 A1 | 5/2007 | Ramer et al. |
| 2007/0100806 A1 | 5/2007 | Ramer et al. |
| 2007/0106564 A1 | 5/2007 | Matotek et al. |
| 2007/0112645 A1 | 5/2007 | Traynor et al. |
| 2007/0112739 A1 | 5/2007 | Burns et al. |
| 2007/0118533 A1 | 5/2007 | Ramer et al. |
| 2007/0118739 A1 | 5/2007 | Togashi et al. |
| 2007/0135084 A1 | 6/2007 | Ido et al. |
| 2007/0136261 A1 | 6/2007 | Taboada et al. |
| 2007/0168354 A1 | 7/2007 | Ramer et al. |
| 2007/0174117 A1 | 7/2007 | Hendrickson et al. |
| 2007/0174389 A1 | 7/2007 | Armstrong et al. |
| 2007/0179792 A1 | 8/2007 | Kramer |
| 2007/0185768 A1 | 8/2007 | Vengroff et al. |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0202900 A1 | 8/2007 | Inselberg |
| 2007/0203887 A1 | 8/2007 | Dynin |
| 2007/0208916 A1 | 9/2007 | Tomita |
| 2007/0233730 A1 | 10/2007 | Johnston |
| 2007/0239724 A1 | 10/2007 | Ramer et al. |
| 2007/0244900 A1 | 10/2007 | Hopkins et al. |
| 2007/0260635 A1 | 11/2007 | Ramer et al. |
| 2007/0266422 A1* | 11/2007 | Germano et al. ............ 726/1 |
| 2007/0274506 A1 | 11/2007 | Schundler |
| 2007/0276829 A1 | 11/2007 | Wang et al. |
| 2007/0282987 A1 | 12/2007 | Fischer et al. |
| 2007/0288427 A1 | 12/2007 | Ramer et al. |
| 2008/0005076 A1 | 1/2008 | Payne et al. |
| 2008/0009268 A1 | 1/2008 | Ramer et al. |
| 2008/0010343 A1 | 1/2008 | Escaffi et al. |
| 2008/0033776 A1 | 2/2008 | Marchese et al. |

(56) References Cited

U.S. PATENT DOCUMENTS

| | | |
|---|---|---|
| 2008/0040428 A1 | 2/2008 | Wei et al. |
| 2008/0040475 A1 | 2/2008 | Bosworth et al. |
| 2008/0070697 A1 | 3/2008 | Robinson et al. |
| 2008/0086458 A1 | 4/2008 | Robinson et al. |
| 2008/0126411 A1 | 5/2008 | Zhuang et al. |
| 2008/0133495 A1 | 6/2008 | Fischer et al. |
| 2008/0133649 A1 | 6/2008 | Pennington et al. |
| 2008/0134035 A1 | 6/2008 | Pennington et al. |
| 2008/0195483 A1 | 8/2008 | Moore |
| 2008/0214148 A1 | 9/2008 | Ramer et al. |
| 2008/0214149 A1 | 9/2008 | Ramer et al. |
| 2008/0214150 A1 | 9/2008 | Ramer et al. |
| 2008/0214151 A1 | 9/2008 | Ramer et al. |
| 2008/0214152 A1 | 9/2008 | Ramer et al. |
| 2008/0214153 A1 | 9/2008 | Ramer et al. |
| 2008/0214154 A1 | 9/2008 | Ramer et al. |
| 2008/0214155 A1 | 9/2008 | Ramer et al. |
| 2008/0214156 A1 | 9/2008 | Ramer et al. |
| 2008/0214157 A1 | 9/2008 | Ramer et al. |
| 2008/0214162 A1 | 9/2008 | Ramer et al. |
| 2008/0214166 A1 | 9/2008 | Ramer et al. |
| 2008/0214204 A1 | 9/2008 | Ramer et al. |
| 2008/0215428 A1 | 9/2008 | Ramer et al. |
| 2008/0215429 A1 | 9/2008 | Ramer et al. |
| 2008/0215475 A1 | 9/2008 | Ramer et al. |
| 2008/0215623 A1 | 9/2008 | Ramer et al. |
| 2008/0231642 A1 | 9/2008 | Okita et al. |
| 2008/0242279 A1 | 10/2008 | Ramer et al. |
| 2008/0270220 A1 | 10/2008 | Ramer et al. |
| 2008/0288612 A1 | 11/2008 | Kwon et al. |
| 2009/0005040 A1 | 1/2009 | Bourne et al. |
| 2009/0029687 A1 | 1/2009 | Ramer et al. |
| 2009/0030952 A1 | 1/2009 | Donahue et al. |
| 2009/0070219 A1 | 3/2009 | D'Angelo et al. |
| 2009/0222329 A1 | 9/2009 | Ramer et al. |
| 2009/0234711 A1 | 9/2009 | Ramer et al. |
| 2009/0234745 A1 | 9/2009 | Ramer et al. |
| 2009/0234861 A1 | 9/2009 | Ramer et al. |
| 2009/0240568 A1 | 9/2009 | Ramer et al. |
| 2009/0240569 A1 | 9/2009 | Ramer et al. |
| 2009/0240586 A1 | 9/2009 | Ramer et al. |
| 2009/0248883 A1* | 10/2009 | Suryanarayana et al. .... 709/229 |
| 2010/0061294 A1* | 3/2010 | Proctor et al. ................ 370/328 |
| 2010/0257023 A1 | 10/2010 | Kendall et al. |
| 2011/0119733 A1* | 5/2011 | Proctor et al. .................... 726/1 |

* cited by examiner

METHOD OF MANAGING AND COMMUNICATING DATA PERTAINING TO SOFTWARE APPLICATIONS FOR PROCESSOR-BASED DEVICES COMPRISING WIRELESS COMMUNICATION CIRCUITRY

RELATED APPLICATIONS

The present application is a continuation-in-part of U.S. patent Ser. No. 11/684,668, filed Mar. 12, 2007 now abandoned, which is a continuation-in-part of U.S. patent Ser. No. 11/424,644, now abandoned, filed Jun. 16, 2006 which (i) claims the benefit of U.S. Provisional Application Ser. No. 60/691,383, filed Jun. 18, 2005 and (ii) is a continuation-in-part of U.S. patent application Ser. No. 10/368,311, filed Feb. 15, 2003 now U.S. Pat. No. 7,194,637 (which, in turn, claims the benefit of U.S. Provisional Application Ser. No. 60/359,549 filed Feb. 25, 2002), all of which are incorporated herein by reference.

BACKGROUND

Limiting access to relevant resources and protected areas to authorized individuals may be important in many circumstances, such as in the case of access to an airport, military installation, office building, etc. Traditional doors and locks can be used for protection of sensitive areas. However, doors with traditional locks and keys may be cumbersome to manage in a setting with a large number of users. For instance, once an employee is fired, it may be difficult to retrieve the physical keys the former employee was issued while employed. Moreover, there is a possibility that copies of such keys were made and never surrendered.

"Smart" doors provide access control to sensitive areas. A smart door may be equipped with a key pad through which a user enters his/her PIN or password. The key pad may have an attached memory and/or elementary processor in which a list of valid PINs/passwords may be stored. Thus, a door may check whether the currently entered PIN belongs to the currently valid list. If so, the door may open. Otherwise, the door may remain locked. Of course, rather than (solely) relying on traditional keys or simple key pads, a more modern smart door may work with cards or other portable devices with various types of memory. Such cards or devices may be used in addition to or instead of traditional keys or electronic key pads. Such magnetic-strip cards, smart cards or contactless devices may have the capability of storing information that is transmitted to the doors. More advanced cards may also have the ability of computing and communicating. Corresponding devices on the doors may be able to read information from the cards, and perhaps engage in interactive protocols with the cards, communicate with computers, etc.

Smart doors can possess various connectivity levels. A fully networked door is one that is at all times connected with some database (or other computer system). For instance, the database may contain information about the currently valid cards, users, PINs, etc. In some instances, to prevent an enemy from altering the information flowing to the door, such connection is secured (e.g., by running the wire from the door to the database within a steel pipe). On the other hand, a totally non-networked door does not communicate outside of its immediate vicinity. In between these two extremes, there may be doors that have intermittent network-capability (e.g., a wirelessly connected "moving" door that can communicate with the outside only when within range of a ground station, such as the door of an airplane or a truck).

Traditional access control mechanisms suffer from many drawbacks. Fully networked doors may be very expensive. The cost of running a secure pipe to a distant smart door may vastly exceed the cost of the smart door itself. Protecting a wire cryptographically, while possibly cheaper, still has its own costs (e.g., those of protecting and managing cryptographic keys). Moreover, cryptography without steel pipes and security guards cannot prevent a wire from being cut, in which case the no-longer-networked door may be forced to choose between two extreme alternatives: namely, remaining always closed or always open, neither of which may be appropriate or practical. In any case, a fully networked door is often not a viable option.

Non-networked smart doors may be cheaper than connected doors. However, traditional approaches to smart doors have their own problem. Consider, for instance, a non-networked smart door capable of recognizing a PIN. A terminated employee may no longer be authorized to go through that door; yet, if he still remembers his own PIN, he may have no trouble opening such an elementary smart door. Therefore, it would be necessary to "deprogram" the PINs of terminated employees, which is difficult for disconnected doors. Such a procedure may be very cumbersome and costly, e.g., an airport facility may have hundreds of doors and dispatching personnel to reprogram all of such doors can be impractical.

DETAILED DESCRIPTION

Representative embodiments are directed to systems and methods for controlling access within a secured facility. In some representative embodiments, access control is implemented using a system of multiple processor-based systems that allow or deny access according to rules, permissions, proofs, etc. A processor-based system is disposed at each object or resource (e.g., door, equipment, computer, particular software, etc.) to which access is controlled. The processor-based system may include a card reader that reads an access card and processes the relevant access information. Based upon the processing, the processor-based systems may keep a door closed, open a door, provide access to the desired resource, deny access to the resource, etc.

In some embodiments, some of the processor-based systems are networked, i.e., have the capacity of communicating over a suitable communications network such as an ethernet network, the Internet, a Wi-Fi network, any suitable combination of networks, etc. The networked processor-based systems utilize their network communication functionality to communicate with a central access control security server. The network communication allows the networked processor-based system to obtain the most up-to-date rules, permissions, proofs, etc. to make the access control decisions.

Some of the processor-based systems are non-networked, i.e., do not possess the functionality to communicate over a network or do not possess a network connection. The non-networked status may be intermittent, temporary, or persistent. Some representative embodiments utilize the access control cards of the users of the system to distribute updated rules, permissions, proofs, etc. In some representative embodiments, "revocation" information is written to user cards at various points (e.g., at networked processor-based systems), the revocation information from the user cards is read by non-networked processor-based systems and is stored locally by the non-networked processor-based systems. Revocation information refers to information that revokes the previously issued or otherwise valid rights of a user to access one, several, or all objects/resources within the secured facility.

As an example, suppose the employment of a first user is terminated and the user's access rights are revoked by updating information in the central access control security server. The first user's identification is added to a "revocation" list on the server. When a second user accesses a processor-based system within the secured facility, the revocation list is written to the second user's access card (assuming that the revocation list was not previously written to the second user's card at a different networked processor-based system). Specifically, the networked processor-based system checks the central access control security server for the most recent revocation information and writes the information to the second user's card. Then, as the second user traverses his/her way through the secured facility, non-networked processor-based systems read the revocation list from the second user's card and store the revocation information locally. If the first user attempts to access any of the doors or other objects within the secured facility that the second user has accessed after obtaining the revocation list, the first user will be denied access.

It shall be appreciated that the revocation information can be written to multiple users' access cards. Then, as the multiple users traverse their way through the secured facility, the updated access information is quickly and efficiently distributed throughout the system. Additionally, non-networked processor based systems can also write the updated revocation or other access information to users' cards. That is, the second user may only go "half-way" through the secured facility. Other users that present their cards to non-networked processor-based systems that processed the second user's card can have the updated information written to cards of the other users. Thereby, the distribution of the updated access information is accelerated through the secured facility.

In some embodiments, a history of access information is maintained by non-networked processor based systems. Portions of the history of access information can be written to users' cards so that when the users interact with networked processor based systems, the information stored on the users' cards can be retrieved and communicated to the central security server. Various algorithms can be used to select the specific information to be written to the users' card, e.g., to prioritize the information to be forwarded. Additionally, cryptographic processing and/or error correction code (ECC) processing can be applied to multiple portions of access history information. By performing such processing, if a subset of the access history portions are available, all of the access history information can be recovered. Also, a random number generator can be used to select the information to be written to users' cards and/or to control when the information is written to reduce the ability of malicious individuals from intercepting specific access history information.

In some embodiments, an access history is written to users' cards as they access objects within the secured facility. The history information can be used to determine (without, necessarily, accessing the central security server) whether users have engaged in inappropriate or suspicious activities. Specifically, non-networked processor based systems can examine this access history to determine whether to provide or deny access by comparing the access history against pre-defined rules. Alternatively, the users cards can be flagged for increased attention at various manned security locations within the secured facility.

In some embodiments, an access control device stores a representation of part or all of a secured facility. The access control device can also store path and tolerance data defining acceptable/permitted paths for users or groups of users for traversing the secured facility. The tolerance data may define acceptable deviations from the defined paths in case an individual takes a slightly but not-materially different path. When an end-user presents his or her, card, the access control device compares the history of accesses as reflected on the end-user's card to the path information. If the information on end-user's card is not consistent with the permitted path information, access can be denied. By making access decisions in this manner, a number of inappropriate activities can be detected and remediated. For example, an end-user cannot use his/her card to enter a secured facility and then use another user's card to access highly secured areas/resources, because the other end-user's card will not possess the correct access history information. Other inappropriate activities can also be detected through such processing.

Figure 1:
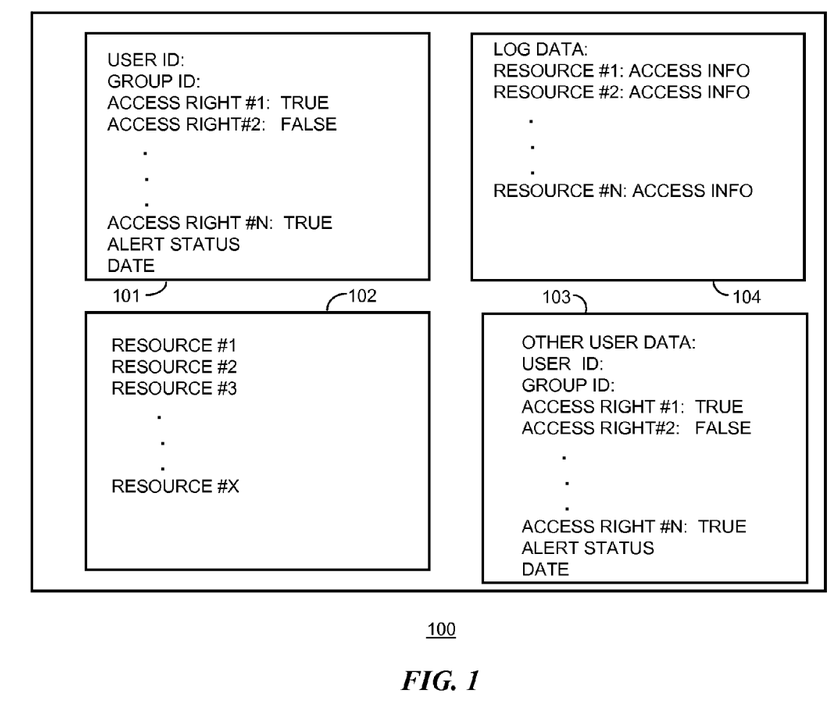
FIG. 1 depicts an access card according to one representative embodiment.

Referring now to the drawings, FIG. 1 depicts access card 100 according to one representative embodiment. Access card 100 can be physically implemented using commercially available cards and devices such as so-called "smart cards," magnetic cards, or any other handheld device possessing readable/writeable memory. Access card 100 differs from conventional cards in regard to the data stored in its memory (e.g., flash memory). Access card 100 preferably includes an interface for reading and writing information to and from the card. The communication may occur according to secured protocols, e.g., as preceded by an exchange of public keys between the card and another device. Access card 100 may include a CPU for performing processing activities (e.g., for authentication, for cryptographic processing, for internal memory management, etc.). Access card 100 may include volatile and non-volatile memory and may store software instructions for controlling the operations of the CPU.

As shown in FIG. 1, card 100 stores information 101 that indicates the access rights of the respective owner of card 100. The access rights may define the rights to doors, tools, equipment, vehicles, computers, particular software applications, etc. The access rights as shown in FIG. 1 are simple Boolean permissions. However, more complicated access right definitions could be defined (e.g., using a suitable mark-up language). Such access right definitions could define time dependent rules as an example. Also, information 101 may preferably include an identifier of the respective user (or alternatively a unique identifier of the card can be used as a proxy identifier for the user). As another example, a PKI key or other digital key could be used as a proxy for the identity of the user. Information 101 may also include a group identifier (e.g., an identifier for a particular group of personnel). Information 101 may also includes information that indicates that additional attention should be applied to the owner (e.g., if the owner has engaged in unusual or inappropriate activities). Card 100 also preferably comprises access history 102 that stores a list of the resources that the owner of card 100 has recently accessed or attempted to access, the time of the access, etc.

Card 100 also comprises access rights information 103 that defines the access rights for other end-users associated with the secured facility. Access rights information 103 can be used to revoke the rights of end-users other than the owner of the card 100. For example, when the owner of card 100 arrives at the secured facility and presents the card 100 to a networked processor-based system to gain access to the secured facility, revocation information can be written to the card 100 that indicates that the rights of one or more other users to one, several, or all resources/objects within the secured area are now revoked. Thus, as the owner of card 100 traverses his or her way through the secured facility, the revocation information can be distributed to the non-networked processor based systems in an efficient manner.

Card 100 also preferably stores log data 104. Log data 104 indicates when specific end-users associated with the secured facility have accessed particular resources. Log data 104 is preferably segmented into multiple portions and processed according to a cryptographic algorithm and error correction code (ECC) algorithm so that if only a subset of log data 104 is available (e.g., a malicious user has intercepted/erased some of the log data), all or substantially all of the access information can be recovered.

Suitable cryptographic processing may be applied to information 101 or other access information such as encryption or digital signatures to authenticate the validity of the data on access cards, access control devices, and/or the central security database/server.

Figure 2:
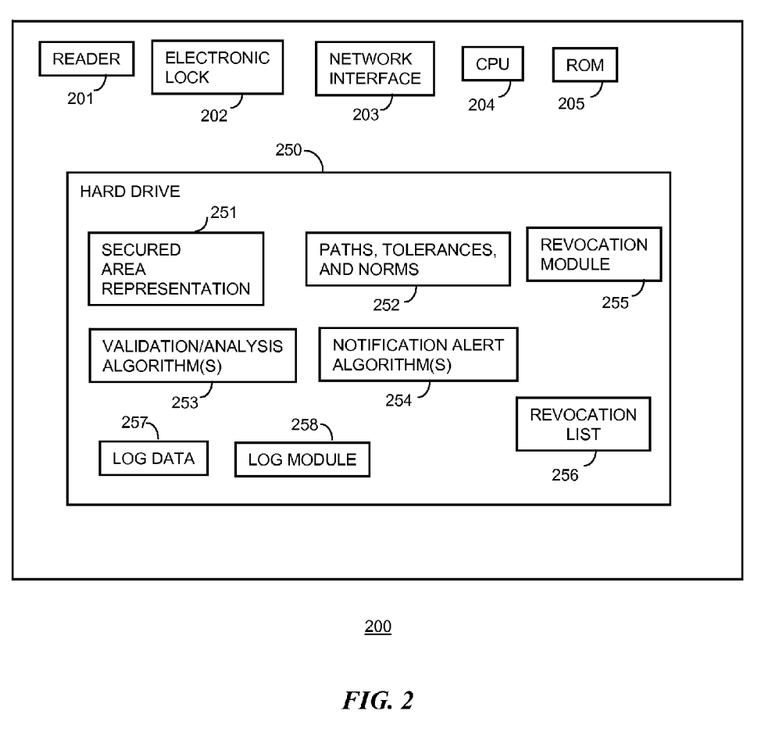
FIG. 2 depicts an access control device according to one representative embodiment.

FIG. 2 depicts access control device 200 according to one representative embodiment. Access control device 200 is preferably implemented as a processor-based system (including CPU 204) which operates according to software instructions stored in ROM 205 and/or hard drive 250. Access control device 200 includes reader 201 for communicating with, reading from, or writing to access cards 100 of end-users. Access control device 200 may also include lock 202 (e.g., a magnetic lock mechanism, a mechanical actuator lock, etc.) that implements the physical access control. Alternatively, lock 202 could implement suitable cryptographic means for controlling access to software, computers, or other processor resources (e.g., make an appropriate decryption key available). Access control device 200 may optionally include network interface 203 if access control device 200 is desired to function as a networked access control device. Network interface 203 may facilitate network communication over a wired network connection and/or a wireless network connection. In one embodiment, system 200 is adapted to conduct wireless communications over a public wireless communication network.

Within hard drive 204 (or any other suitable non-volatile or volatile memory), a number of data structures and software files can be stored to facilitate the access decisions of electronic lock system 200.

In some embodiments, hard drive 204 stores validation/analysis algorithms 253 that read the data stored on a respective end-user's card 100, compares the data from the card to locally stored data, determines whether to allow access, and denies or provides access. The access decision may comprise determining whether the end-user should be given access by reading the access rights encoded on his/her card 100 and confirming the access rights using suitable cryptographic processing. In alternative embodiments, the end-user rights are stored within memory of access device 200 and access device 200 performs a look-up of those rights using a user identifier (e.g., the unique access card serial number) and/or a group identifier. The access decision may also involve analysis of the history of prior accesses/access attempts as recorded by data on the card 100 in view of secured access representation 251 and path, tolerances, and norm data 252 which will be discussed in greater detail below. Also, the access decision may involve determining whether the access rights retrieved from the end-user's card 100 has been revoked by comparison against revocation data list(s) 256.

In some embodiments, hard drive 204 stores revocation module 255. Revocation module 255 reads revocation data from access cards and stores revocation data in local revocation data list(s) 256. Also, revocation module 255 writes data from local revocation data list(s) 256 to access cards 100.

In some embodiments, hard drive 204 stores log module 258 which logs accesses and access attempts to log data file(s) 257. The log data file(s) 257 preferably detail the identifiers of end-users who have attempted to obtain access through access control device 200, times of access attempts, whether access was granted, etc. The log data is preferably replicated into multiple portions and an error correction code (ECC) processing is applied to the multiple portions. Also, cryptographic processing is preferably applied to the log data. Log module 258 preferably writes selected log data to access cards 100 as users attempt to obtain access through access control device 200. The log data can be prioritized (e.g., the most recent or most important data can be written first). Also, a random number generator function/routine can be used to control when to write data and/or what data to write. By employing the cryptographic processing, ECC processing, and random number generation, malicious individuals will find it much more difficult to intercept, modify, and/or destroy data before the data is communicated to the central security server.

Figure 3:
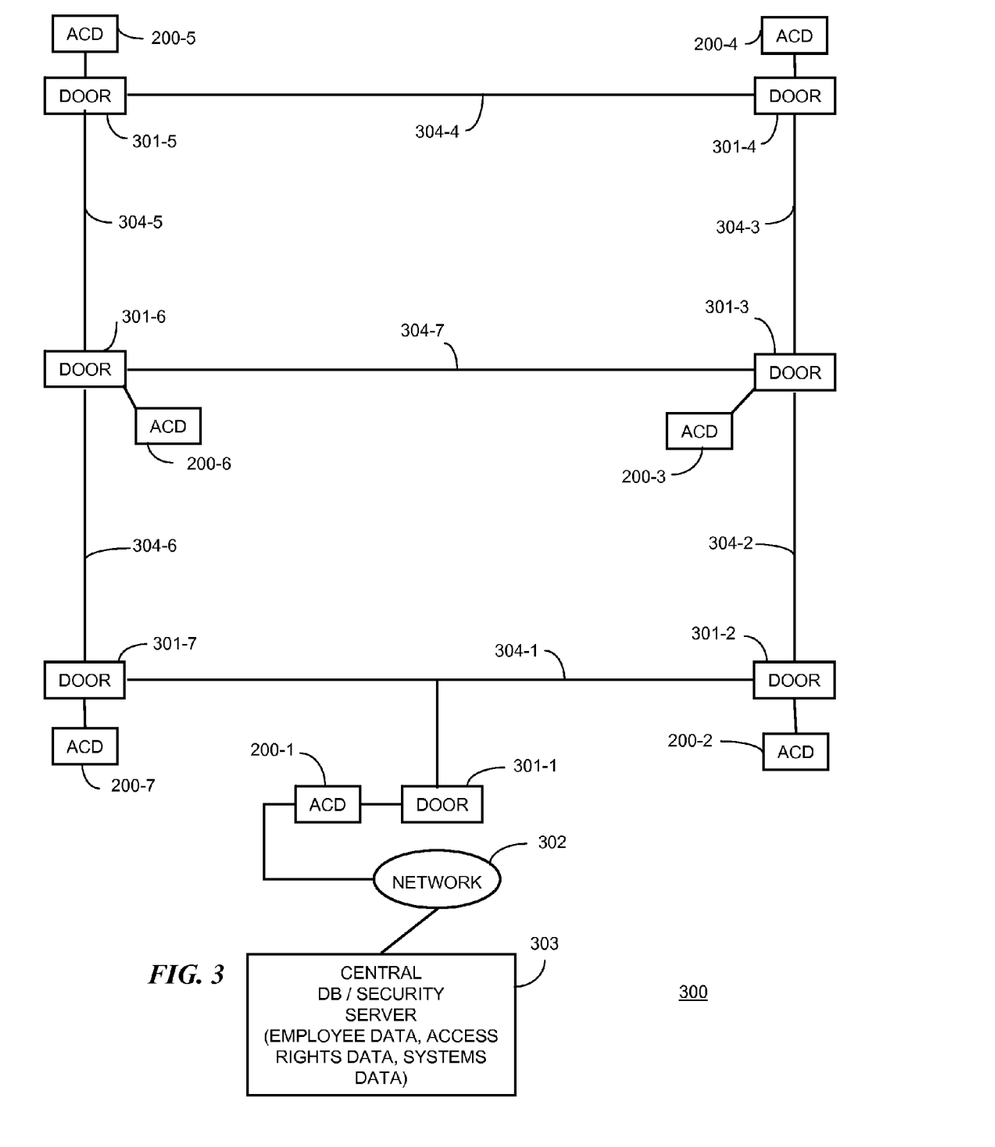
FIG. 3 depicts a secured facility according to one representative embodiment.

FIG. 3 depicts secured facility 300 according to one representative embodiment. The architecture and organization of secured facility 300 is by way of example. Any suitable architecture, organization, size, and complexity of a secured facility can be controlled by selected representative embodiments.

Secured facility 300 includes primary door 301-1 that is controlled by access control device 200-1. Access control device 200-1 is networked, e.g., is connected to central database/security server 303 through network 302. Central database/security server 303 preferably stores employee data, access rights data, system data (e.g., identification of access control devices within the system, whether the respective devices are networked or non-networked, etc.). When an end-user initially enters secured facility 300, the end-user can present his/her access card 100 and access control device 200-1 can determine whether the end-user is currently permitted to have access to secured facility 300 by communicating with database/server 303. If so, access control device 200-1 opens door 301-1. Otherwise, access control device 200-1 denies access. In some representative embodiments, security personnel can be stationed at door 200-1 to ensure that the end-user is not using some other end-user's card 100. For example, user photographs can be printed on the cards for review by security personnel or biometric information can be sampled. Also, in some embodiments, access control device 200-1 can write a suitable "permission" for the day (or other suitable amount of time) to the card 100 of the end-user that enables the end-user to access one, some, or all controlled resources within secured facility 300 for that day or other suitable period of time.

After the user enters door 301-1, the user enters hallway 304-1. Without regard to the access rules, rights, etc., the user can proceed to the right to door 301-2 or to the left to door 301-7. These doors are controlled by access control devices 200-2 and 200-7, respectively. From door 301-2, the end-user can proceed to door 301-3 through hallway 304-2; door 301-3 is controlled by non-networked access control device 200-3. From door 301-3, the end-user can proceed to door 301-4 (e.g., a multi-door unit that controls traffic in multiple directions) through hallway 304-3 or to door 301-6 through hallway 304-7. Doors 301-4 and 301-6 are controlled by non-networked access control devices 200-4 and 200-7, respectively. Doors 301-4 and 301-5 are connected by hallway 304-4. Door 301-5 is controlled by non-networked access control device 200-5. From door 301-5, the end-user can proceed to door 301-6 through hallway 304-5. Door 301-6 is controlled by non-networked access control device 200-6. From door 301-6, the end-user can proceed through hallway 304-6 to door 301-7. Clearly, the end-user can proceed through the hallways in either direction.

Now as the user initially enters secured facility 300, access control device 200-1 communicates with database/sever 303 and obtains recently updated revocation data. Access control device 200-1 then writes some or all of the revocation data to the access card 100 of the end-user. As the user traverses his/her way through secured facility 300, the revocation data on the user's card 100 can be distributed to the non-networked access control devices 200.

As previously discussed, access control devices 200 preferably utilize the path that a user has taken through the secured facility to determine whether to provide access. When end-user access of resources indicates an out-of-order access of access points, omission of one or several access point accesses, time limit violations, or other inappropriate actions, appropriate action can be taken such as denial of further access within secured facility 300.

Figure 4:
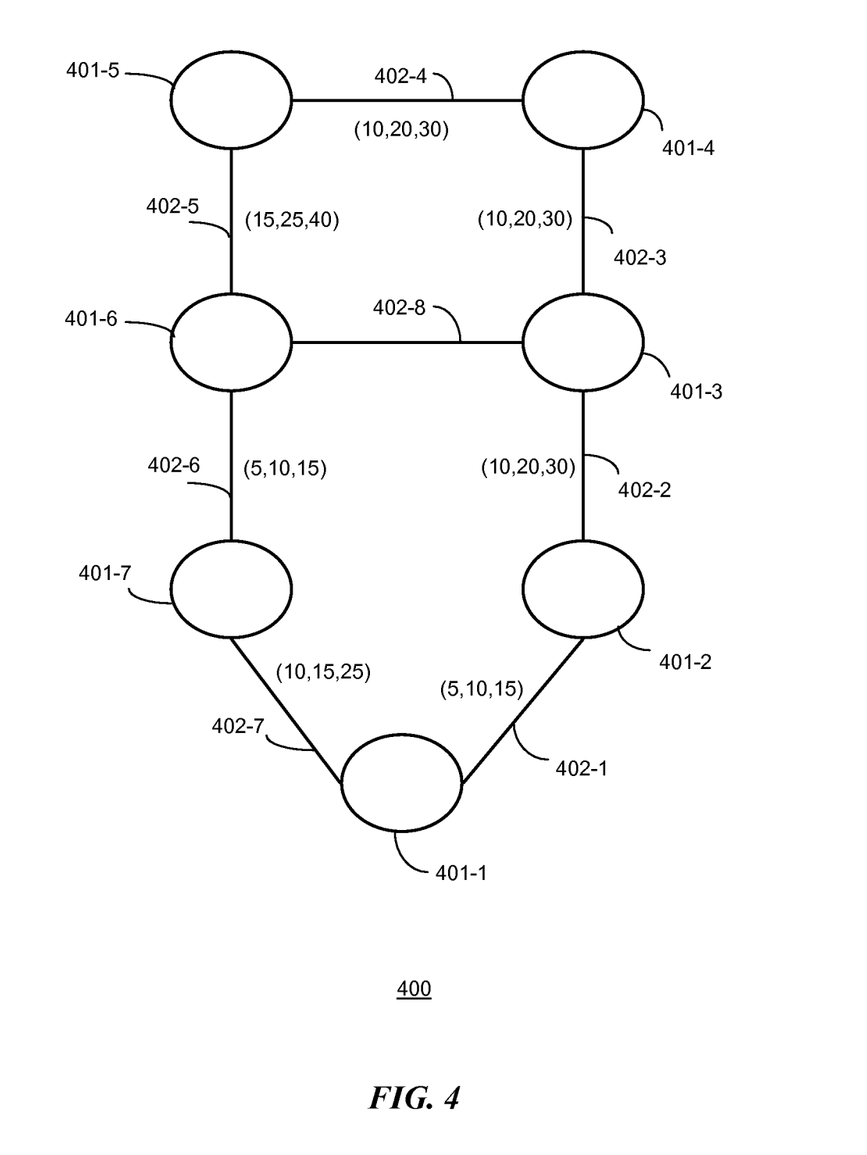
FIG. 4 depicts a digital representation of the secured facility according to one representative embodiment which may be stored (in whole or in part) within access control devices to facilitate access control decisions.

FIG. 4 depicts representation 400 of secured facility 300 according to one representative embodiment which may be stored (in whole or in part) within access control devices 200. Representation 400 represents the secured facility as a graph having nodes and edges. In one embodiment, a directed graph can also be utilized. Representation 400 includes node 401 which corresponds to the primary door 200-1 of secured facility 300. Each node is preferably implemented as a suitable data structure that stores an identifier of the access control unit 200 that controls the respective resources, stores an identifier of the type of resource, stores an identifier whether the resources is networked, non-networked, or intermittently networked, etc. From node 401, edge or link 402-1 represents the portion of hallway 304-1 that leads to door 200-2 and edge or link 402-7 represents the other portion of hallway 304-1. Each edge or link is preferably implemented by pointers or references that are stored in each respective node that point to or reference the data structures of connected nodes. Any suitable representation of secured facility 300 could be alternatively employed to store the appropriate information (e.g., tables, arrays, databases, relational databases, etc.).

Nodes 401-2 through 401-7 respectively represent doors 200-2 through 200-7. Edges or links 402-2, 402-3, 402-4, 402-5, 402-6, 402-7, and 402-8 respectively represent hallways 304-2, 304-3, 304-5, 304-5, 304-6, and 304-7. Each edge link can be associated with information that defines an amount of time used to traverse the hallways, passageways, distances between doors. For example, as shown in FIG. 4, the data (5, 10, 15) represents the minimum amount of time, the average time, and the maximum amount of time to proceed from door 301-1 to door 301-2.

Figure 5:
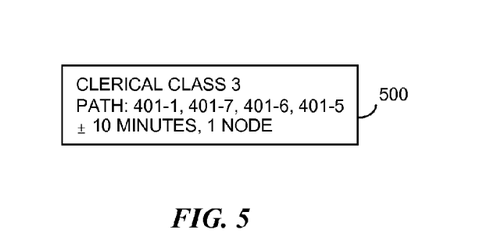
FIG. 5 depicts a permitted path data structure for a group of employees according to one representative embodiment.

Suppose a group of employees work in an office that is immediately past door 301-5 and accessible from hallway 304-4. FIG. 5 depicts permitted path data structure for such a group of employees. As shown in FIG. 5, data structure includes a group identifier ("CLERICAL CLASS 3"). The path that is authorized for this group of employees is defined by (401-1, 401-7, 401-6, and 401-5) as shown in FIG. 5. The error tolerance for these employees is given by ±10 minutes and one node. That is, if a particular end-user takes more than 10 minutes over a maximum amount of time to proceed from one node to another, the user can be flagged for increased supervisory attention (e.g., inspection) at an appropriate location. Additionally or alternatively, the user can be denied access to continue through additional doors. Other time tolerance parameters or security level rules can be used to make the decision whether to deny access upon deviation from the defined path information. A distance tolerance of 1 node is allowed for this group of employees. That is, an employee can deviate from the defined path by one node or door. For example, suppose a user could pass door 301-3 from door 301-6 but could not then proceed through door 301-4. The time and distance limitations can be enforced by comparing the node and time information stored on the user's access card to representation 400 and the path information in data structure 500.

In some representative embodiments, access control devices 200 are adapted to display the next appropriate link in the user's path as defined by suitable path information, permissions, user identity, group identity, and/or the like. Specifically, when a user presents his/her card 100 to an access control device 200, the device can display a map of a portion or all of the secured facility thereby graphically' illustrating the path(s) that can/should be taken by the user. Access control devices 200 can also be adapted to display other information. For example, if a supervisor or security personnel presents his/her card 100 to an access control device 200, the individual can be given the option of reviewing individuals that have recently accessed the resource/door or attempted to access the resource/door. Also, to the extent that suspicious activity has been detected (e.g., out-of-bounds times of traversal from node to node), the access control device 200 can display alert information identifying the incident(s) and the users(s)/user card(s) associated with the incident(s).

The path definitions can be used to implement other appropriate security policies with a secured facility. For example, a "choose one path from multiple paths" security policy could be implemented. Specifically, a specific user or group of users may be allowed to access many locations in a secured facility. However, during a given time frame, the user(s) only need to access one location of the multiple allowed locations. An array or table-like data structure could store multiple data structures 500 that define the permitted paths to each of these locations. Validation/analysis algorithms 253 may identify the initial doors/resources accessed by an end-user as recorded on the user's card 100 and compare those initial doors against the various data structures 500 in the array-like data structure thereby identifying the initial path taken by the user. From there, the respective access control device 200 can determine whether the current door is appropriate. Thus, once a user begins his/her way through the secured facility, the user is no longer allowed to go anywhere at anytime. Instead, the user must proceed to a specific location.

For example, a multi-path data structure could be defined as follows {PATH1: A,B,C,D,E; PATH2: A,F,G,H,I}. An end-user authorized to proceed through a secured facility according to such a multi-path definition could be required to begin at access point A. From there, the end-user can proceed either to access point B or access point F. If the user accesses point B, path 2 is no longer valid. Alternatively, if the user accesses point F, path 1 is no longer valid.

Also, a "one way" security policy may be defined in which a user is not allowed to "back track" within the secured facility thereby further limiting the ability of user's to traverse the secured facility at will. For example, access devices 200 may be programmed (e.g., by suitable rule definition for certain paths) to only allow access through access points according to the order of those access points in a permitted path definition. The permitted path structure can be extended by objected oriented programming, as an example, to define a path definition {OneWayPath: A,B,C,D,E . . . } for this purpose. The end-user can be allowed to only back track a limited number of nodes by including an integer parameter in the one way path data structure that defines the number of nodes that are permitted for "back tracking."

In some secured facilities, one or several "free paths" may be implemented to allow the end-user to return to one or several initial/primary validation points, to leave the facility under normal conditions, to exit the facility on an emergency basis, etc. Upon returning to one of the initial/primary validation points, the user can also be re-evaluated/re-validated by security personnel, the central security DB/server, etc. After re-validation, the respective user can then take a path to a different location (if desired). In some embodiments, a rule can be defined (as stored in access control cards, access control devices, and/or the central security database/server) that requires a user to return to a revalidation point after accessing specific identified resources.

Also, when end-users return to the initial/primary validation point (or any other point having a networked access control device 200), the control device 200 preferably reads log information from the end-user's card 100 and communicates the information to central DB/security server 303. Specifically, the log information written to the end-user's card by the various non-networked access control devices 200 are forwarded to the central DB/security server 303 for processing. The processing may include cryptographic processing, ECC processing, etc. Also, the processing may include analysis to identify aberrant behavior.

In some embodiments, an analysis of the log data is performed to determine "norm" behavior. The "norm" behavior may be performed to determine the common patterns for particular individual end-users, for particular classes of end-users, or for all end-users. The analysis may include determining the typical location(s) of end-users at particular times, the probability of one or several end-users being located at various locations, the typical minimum, average, maximum times spent at various locations, the typical minimum, average, maximum times spent traveling between locations, etc. The norms can be used to define the path information. Also, the norm information can be written to user card 100 and/or to access control devices 200 to allow the analysis of user access activities to be distributed throughout the secured facility 300. The norm information can be used to identify potentially inappropriate activities by end-users. The inappropriate activities need not necessarily be direct security-related issues. The processing may identify potentially poor job performance by personnel within the secured facility.

Figure 6:
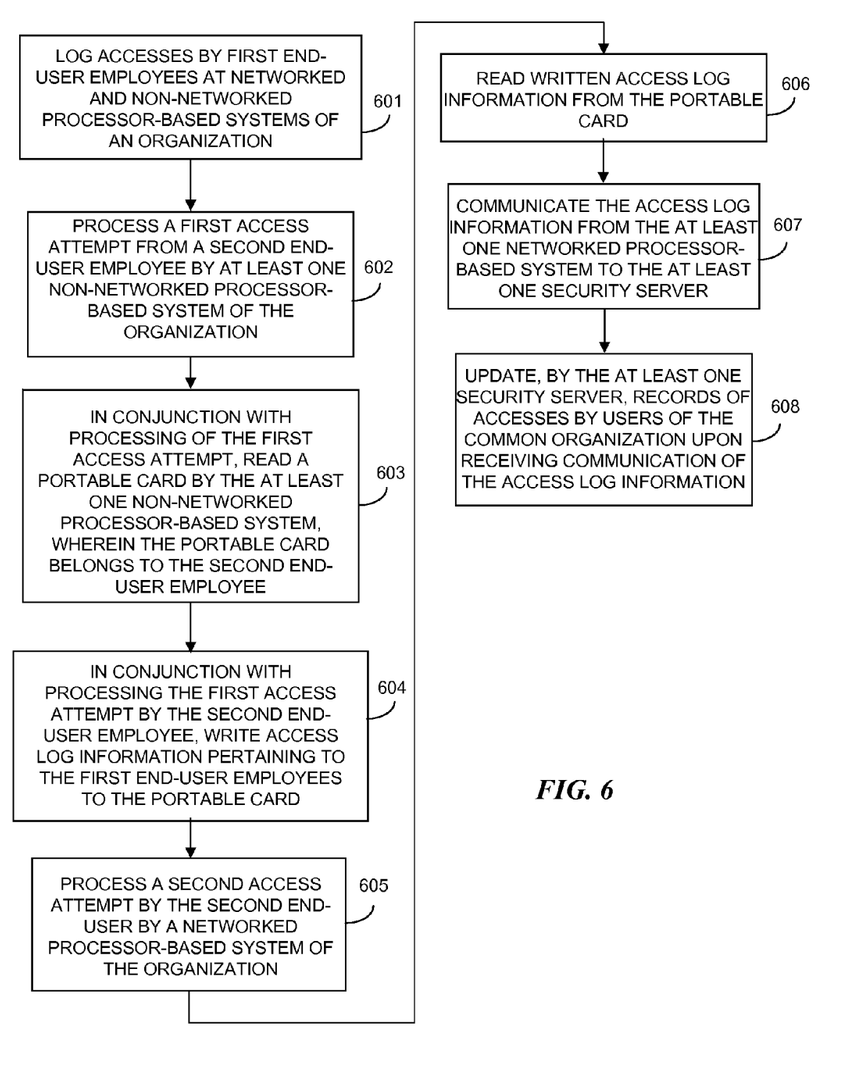
FIG. 6 depicts a flowchart of operations within a secured facility according to one representative embodiment.

FIG. 6 depicts a flowchart of operations within a secured facility according to one representative embodiment. In 601, first access attempts from end-user employees are processed by the at least one networked processor-based system of an organization. In 602, in conjunction with processing of the first access attempts, communication with the at least one security server to obtain access rights information relevant to the respective end-users occurs. In 603, access rights information obtained from the at least one security server by the at least one networked processor-based system is written to portable cards. In 604, the portable cards are physically transported by the end-users to non-networked processor-based systems.

In 605, further access attempts from the end-users are processed by non-networked processor-based systems. In 606, in conjunction with processing of the further access attempts, access log information is written to the portable cards of each respective end-user, wherein the access log information includes time-stamps for times associated with accesses by the respective end-users. In 607, in conjunction with processing of the further access attempts, time stamps of accesses by each end-user for multiple accesses on multiple processor-based systems are analyzed against one or more access rules, the one or more rules defining one or more relative timing constraints or order constraints for accesses on multiple processor-based systems. In 608, in conjunction with processing of the further access attempts, access decisions are controlled in response to determining whether the time stamps of respective end-users indicate that said respective end-users have violated the one or more access rules.

In embodiments, one or more access control devices 200 in a secured facility are adapted for intermittant network connectivity. Also, in one specific embodiment, one or more access control devices 200 are adapted to conduct wireless communications over a public wireless network. In this embodiment, one or more access control devices 200 may be set up in a quick and efficient manner to establish access control decision points. In some embodiments, these access control devices 200 may even be moved to new locations and established to operate in an ad hoc basis.

These one or more access control devices 200 may operate in two modes. In one mode, these access control devices 200 possess network connectivity. In this first mode operation, code for downloading is operable to download through the wireless communication circuitry, to the internal memory, access rights information from a distribution server, the access rights information independently originating and being cryptographically authenticated from multiple sources, the access rights information including revocation data that is specific to respective identified individuals.

In a second mode of operation, code for reading and processing identity information and access rights information from a portable memory card via the reader is operable. The identify information comprises first and last name information pertaining to a specific user and employer organization information of the specific user, where the code for reading and processing cryptographically authenticates the first and last name information and the employer information.

In the second mode of operation, code for comparing information from the portable card pertaining to the specific user against previously downloaded access rights information in the internal memory for revocation data identifying the specific user is operable.

In the second mode of operation, code for completing an access decision in the second mode of operation and code for displaying a result of the access decision on the display in the second mode of operation are operable. Further, the code for reading and processing, code for comparing, code for completing, and code for displaying are operable in the second mode of operation to function without requiring network connectivity.

When implemented in software (e.g., software in the end-user access cards, access control devices, and/or the central security server), various elements or components of some representative embodiments are the code or software segments adapted to perform the respective tasks. The program or code segments can be stored in a computer readable medium, such as a processor readable medium, or transmitted by a computer data signal embodied in a carrier wave, or a signal modulated by a carrier, over a transmission medium. The "computer readable medium" may include any medium that can store or transfer information. Examples of the computer readable medium or memory include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, combinations thereof, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Although some representative embodiments and advantages have been described in detail, it should be understood that various changes, substitutions and alterations can be made herein without departing from the spirit and scope of the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure that processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

Figure 7:
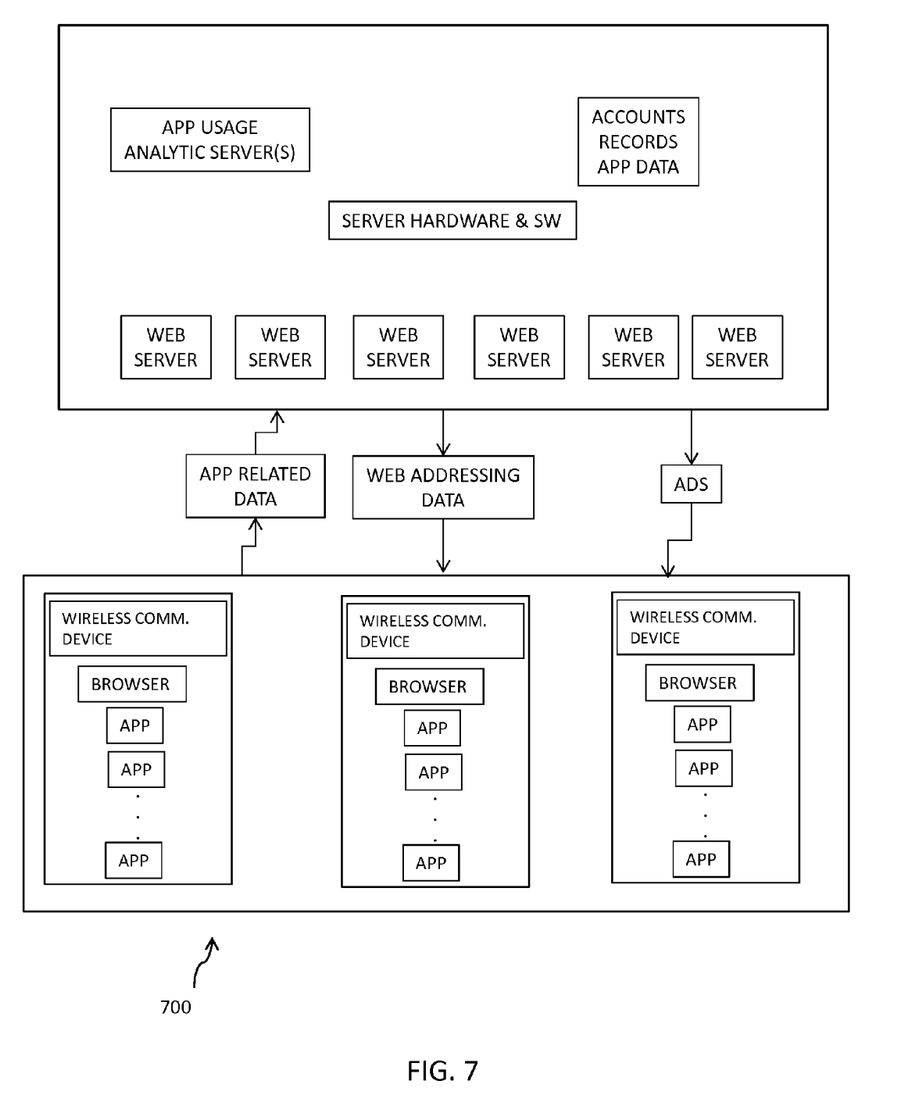
FIG. 7 depicts system 700 for managing and communicating data pertaining to software applications for processor-based devices comprising wireless communication circuitry according to embodiment(s) that are independent of the embodiments of FIGS. 1-6.

Referring to FIG. 7, system 700 is shown for managing and communicating data pertaining to software applications for processor-based devices comprising wireless communication circuitry according to embodiment(s) that are independent of the embodiments of FIGS. 1-6. In these independent embodiment(s), a method of managing and communicating data pertaining to software applications for processor-based devices comprising wireless communication circuitry is performed. The method comprises maintaining respective accounts for a plurality of different software application developers for a plurality of different software applications by a software use tracking system, wherein (i) the plurality of different software applications are not browser applications, (ii) the software use tracking system comprises computer server hardware and software, and (iii) each of the plurality of different software applications comprises code for interacting with the software use tracking system with the code for interacting comprising: (1) first code for performing one or more software operations to automatically obtain location information pertaining to a respective executing device without manual user entry of the location information during execution of the respective software application; (2) second code for performing one or more software operations to retrieve user, device, or hardware identifying information of a respective executing device; (3) third code for dynamically obtaining web resource addressing data from the software use tracking system without a respective user of a respective device engaging in web browsing operations; and (4) fourth code for controlling a separate browser application according to web resource addressing data obtained from the software use tracking system to communicate with one or more web servers. The devices comprising wireless communication circuitry may comprise multiple applications with each application including the first, second, third, and fourth code, wherein the fourth code causes the separate browser application to communicate at least one tracking identifier traceable, in the software use tracking system, to the respective software application that caused the separate browser application to communicate with one or more web servers using the web resource addressing information, and wherein the software use tracking system employs respective tracking identifiers, communicated by the separate browser application, to generate analytic data for completed browser operations, the analytic data pertaining to the plurality of software applications.

The method further comprises interacting with the plurality of different software applications, when executed on a plurality of different devices, by the software use tracking system to generate app usage data, wherein the interacting comprises: (a) communicating a plurality of different web resource addressing data for receipt by the third code of the plurality of different software applications during respective execution of the plurality of different software applications; (b) receiving information pertaining to internet communication transactions, over one or more networks, originating from browser application operations initiated by the fourth code of the plurality of different software applications using the communicated plurality of different web resource addressing data; (c) storing and associating the received information from (b) with records related to the respective accounts of the plurality of different software vendors; (d) associating software use information in records of the software use tracking system with the location information obtained by the first code of the plurality of different software applications; (e) associating software use information in records of the software use tracking system with the user, device, or hardware identifying information obtained by the second code of the plurality of different software applications; wherein the storing records related to completed browser application operations initiated by the fourth code of the plurality of different software applications includes employing the respective tracking identifiers communicated by the separate browser applications that caused the separate browser applications to communicate with one or more web servers using the web resource addressing information; wherein the processing employs the respective tracking identifiers, communicated by the separate browser applications, to generate analytic data related to the plurality of software applications; and wherein the software use tracking system employs the respective tracking identifiers, communicated by the separate browser applications that caused the separate browser applications to communicate with one or more web servers using the web resource addressing information, to conduct operations related to commercial offers directed to users of the plurality of software applications.

The method further comprises processing the app usage data received from the plurality of software applications to generate app use analytic data, wherein the processing comprises (i) analyzing the app usage data on a group basis of multiple applications and (ii) analyzing the app usage data on a geographical region basis.

The method further comprises selecting commercial offers for communication to users of the plurality of software applications in a manner that is at least dependent upon the location information and upon use multiple software applications by different users of the respective devices. The commercial offers may include gift certificates or coupons.

The plurality of different software applications may comprise fifth code for identifying an operating system type of a respective device for communication to the software use tracking system for association with app usage data. The software use tracking system may further provide versioning control operations for the plurality of software applications. Also, the software use tracking system may further provide a web interface for managing user accounts for specific individual users of the devices, the web interface permits the user to enter personal registration information, and the software use tracking system links individual user accounts to specific software applications installed by the users on corresponding devices.

What is claimed is:

1. A method of managing and communicating data pertaining to software applications for processor-based devices comprising wireless communication circuitry, the method comprising:
   maintaining respective accounts for a plurality of different software application developers for a plurality of different software applications by a software use tracking system, wherein (i) the plurality of different software applications are not browser applications, (ii) the software use tracking system comprises computer server hardware and software, and (iii) each of the plurality of different software applications comprises code for interacting with the software use tracking system with the code for interacting comprising: (1) first code for performing one or more software operations to automatically obtain location information pertaining to a respective executing processor-based device comprising wireless communication circuitry without manual user entry of the location information during execution of the respective software application; (2) second code for performing one or more software operations to retrieve user, device, or hardware identifying information of a respective executing processor-based device comprising wireless communication circuitry; (3) third code for dynamically obtaining web resource addressing data from the software use tracking system without a respective user of a respective processor-based device comprising wireless communication circuitry engaging in web browsing operations; and (4) fourth code for controlling a separate browser application according to web resource addressing data obtained from the software use tracking system to communicate with one or more web servers;
   interacting with the plurality of different software applications, when executed on a plurality of different processor-based devices comprising wireless communication circuitry, by the software use tracking system to generate application use data, wherein the interacting comprises: (a) communicating a plurality of different web resource addressing data for receipt by the third code of the plurality of different software applications during respective execution of the plurality of different software applications; (b) receiving information pertaining to internet communication transactions, over one or more networks, originating from browser application operations initiated by the fourth code of the plurality of different software applications using the communicated plurality of different web resource addressing data; (c) storing records related to completed browser application operations initiated by the fourth code of the plurality of different software applications; (d) associating software use information in records of the software use tracking system with the location information obtained by the first code of the plurality of different software applications; (e) associating software use information in records of the software use tracking system with the user, device, or hardware identifying information obtained by the second code of the plurality of different software applications;
   processing, by the software use tracking system, application use data received from the plurality of software applications to generate application use analytic data, wherein the processing comprises (i) analyzing the application use data on a group basis of multiple applications and (ii) analyzing the application use data on a geographical region basis;
   selecting commercial offers for communication to users of the plurality of software applications in a manner that is at least dependent upon the location information and upon use of multiple software applications by different users of the respective processor-based devices comprising wireless communication circuitry; and
   communicating, by the software use tracking system, the commercial offers to users of the software applications.

2. The method of claim 1 wherein the commercial offers include gift certificates.

3. The method of claim 1 wherein the commercial offers include coupons.

4. The method of claim 1 wherein the plurality of different software applications comprise fifth code for identifying an operating system type of a respective processor-based device comprising wireless communication circuitry for communication to the software use tracking system for association with application use data.

5. The method of claim 1 wherein the software use tracking system provides versioning control operations for the plurality of software applications.

6. The method of claim 1 wherein the software use tracking system provides a web interface for managing user accounts for specific individual users of the processor-based devices comprising wireless communication circuitry, the web interface permits the user to enter personal registration information, and the software use tracking system links individual user accounts to specific software applications installed by the users on corresponding processor-based devices comprising wireless communication circuitry.

7. The method of claim 1, wherein the fourth code causes the separate browser application to communicate at least one tracking identifier traceable, in the software use tracking system, to the respective software application that caused the separate browser application to communicate with one or more web servers using the web resource addressing information;
   wherein the storing records related to completed browser application operations initiated by the fourth code of the plurality of different software applications includes employing the respective tracking identifiers communicated by the separate browser applications that caused the separate browser applications to communicate with one or more web servers using the web resource addressing information;
   wherein the processing employs the respective tracking identifiers, communicated by the separate browser applications, to generate analytic data related to the plurality of software applications; and
   wherein the software use tracking system employs the respective tracking identifiers, communicated by the separate browser applications that caused the separate browser applications to communicate with one or more web servers using the web resource addressing information, to conduct operations related to commercial offers directed to users of the plurality of software applications.

8. A programmable computing device for executing a plurality of applications and for conducting wireless communications, the device comprising:
- a processor;
- wireless communications circuitry; and
- memory for storing programs and data that include:
  - a plurality of different software applications, identified as originating from a plurality of different software application developers, that are each adapted to interact with a software use tracking system that tracks application use, generates application use analytic data, and communicates commercial offers to users of programmable computing devices, wherein (i) the plurality of different software applications are not browser applications, and (ii) each of the plurality of different software applications comprises code for interacting with the software use tracking system with the code for interacting comprising: (1) first code for performing one or more software operations to automatically obtain location information pertaining to the device without manual user entry of the location information during execution of the respective software application; (2) second code for performing one or more software operations to retrieve user, device, or hardware identifying information of the device; (3) third code for dynamically obtaining web resource addressing data from the software use tracking system without a respective user of the device engaging in web browsing operations; and (4) fourth code for controlling a separate browser application according to web resource addressing data obtained from the software use tracking system to communicate with one or more web servers;
  - wherein during execution of a respective one of the plurality of different software applications, (a) web resource addressing data is received by the third code of the respective one of the plurality of different software applications; (b) the fourth code of the respective one of the plurality of different software applications controls a separate web browser application to communicate data with one or more servers using web resource addressing data received by the third code, wherein the fourth code causes the separate browser application to communicate at least one tracking identifier traceable, in the software use tracking system, to the respective software application that caused the separate browser application to communicate with one or more web servers using the web resource addressing information, and wherein the software use tracking system employs respective tracking identifiers, communicated by the separate browser application, to generate analytic data for completed browser operations, the analytic data pertaining to the plurality of software applications, ; and (c) the respective one of the plurality of different software applications communicates location information and user, device, or hardware identifying information obtained by the first code and the second code respectively to the software use tracking system.

9. The device of claim 8 wherein the commercial offers include gift certificates.

10. The device of claim 8 wherein the commercial offers include coupons.

11. The device of claim 8 wherein the plurality of different software applications comprise fifth code for identifying an operating system type of the device for communication to the software use tracking system for association with application use data.

12. The device of claim 8 wherein the software use tracking system provides versioning control operations for the plurality of software applications.

13. A method of managing and communicating data pertaining to software applications for programmable computing devices adapted for wireless communication, the method comprising:
- maintaining respective accounts for a plurality of different software application developers for a plurality of different software applications by a software use tracking system, wherein (i) the plurality of different software applications are not browser applications, (ii) the software use tracking system comprises computer server hardware and software, and (iii) each of the plurality of different software applications comprises code for interacting with the software use tracking system with the code for interacting comprising: (1) first code for performing one or more software operations to automatically obtain location information pertaining to a respective executing programmable computing device without manual user entry of the location information during execution of the respective software application; (2) second code for performing one or more software operations to retrieve user, device, or hardware identifying information of a respective executing programmable computing device; (3) third code for dynamically obtaining web resource addressing data from the software use tracking system without a respective user of a respective programmable computing device engaging in web browsing operations; and (4) fourth code for controlling a separate browser application according to web resource addressing data obtained from the software use tracking system to communicate with one or more web servers, wherein the fourth code causes the separate browser application to communicate at least one tracking identifier traceable, in the software use tracking system, to the respective software application that caused the separate browser application to communicate with one or more web servers using the web resource addressing information;
- interacting with the plurality of different software applications, when executed on a plurality of different programmable computing device adapted for wireless communications, by the software use tracking system to generate application use data, wherein the interacting comprises: (a) communicating a plurality of different web resource addressing data for receipt by the third code of the plurality of different software applications during respective execution of the plurality of different software applications; (b) receiving information pertaining to internet communication transactions, over one or more networks, originating from browser application operations initiated by the fourth code of the plurality of different software applications using the communicated plurality of different web resource addressing data; (c) storing records related to completed browser application operations initiated by the fourth code of the plurality of different software applications including employing the respective tracking identifiers communicated by the separate browser applications that caused the separate browser applications to communicate with one or more web servers using the web resource addressing information; (d) associating software use information in records of the software use tracking system with the location information obtained by the first code of the plurality of different software applications; (e) associating software use information in records of the software use tracking system with the user, device, or hardware identifying information obtained by the second code of the plurality of different software applications;

processing, by the software use tracking system, application use data received from the plurality of software applications to generate application use analytic data, wherein the processing employs the respective tracking identifiers, communicated by the separate browser applications, to generate analytic data related to the plurality of software applications;

selecting commercial offers for communication to users of the plurality of software applications, wherein the software use tracking system employs the respective tracking identifiers, communicated by the separate browser applications that caused the separate browser applications to communicate with one or more web servers using the web resource addressing information, to conduct operations related to commercial offers directed to users of the plurality of software applications; and communicating, by the software use tracking system, the commercial offers to users of the software applications.

14. The method of claim 13 wherein the commercial offers include gift certificates.

15. The method of claim 13 wherein the commercial offers include coupons.

16. The method of claim 13 wherein the plurality of different software applications comprise fifth code for identifying an operating system type of a respective programmable computing device for communication to the software use tracking system for association with application use data.

17. The method of claim 13 wherein the software use tracking system provides versioning control operations for the plurality of software applications.

18. The method of claim 13 wherein the software use tracking system provides a web interface for managing user accounts for specific individual users of the programmable computing devices, the web interface permits the user to enter personal registration information, a n d the software use tracking system links individual user accounts to specific software applications installed by the users on corresponding programmable computing devices.

* * * * *